(12) United States Patent
Budano et al.

(10) Patent No.: US 12,321,952 B2
(45) Date of Patent: *Jun. 3, 2025

(54) SYSTEM PROVIDING SELF-SERVICE ACCESS TO LOCKED FITTING ROOMS

(71) Applicant: Indyme Solutions, LLC, San Diego, CA (US)

(72) Inventors: Joseph Budano, San Diego, CA (US); Steven Deal, San Diego, CA (US)

(73) Assignee: Indyme Solutions, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/759,302

(22) Filed: Jun. 28, 2024

(65) Prior Publication Data
US 2025/0005603 A1 Jan. 2, 2025

Related U.S. Application Data

(60) Division of application No. 17/987,728, filed on Nov. 15, 2022, now Pat. No. 12,045,841, which is a
(Continued)

(51) Int. Cl.
*G06Q 30/018* (2023.01)
*G06F 16/28* (2019.01)
(Continued)

(52) U.S. Cl.
CPC ....... *G06Q 30/0185* (2013.01); *G06F 16/285* (2019.01); *G06K 7/10297* (2013.01);
(Continued)

(58) Field of Classification Search
CPC .............. G06Q 30/0185; G06F 16/285; G06K 7/10297; G06K 7/10415
See application file for complete search history.

(56) References Cited

U.S. PATENT DOCUMENTS 11,182,803 B2 * 11/2021 Budano .................... G07C 9/37
11,216,827 B2 * 1/2022 Budano .............. G07C 9/00571
(Continued)

*Primary Examiner* — Matthew Mikels
(74) *Attorney, Agent, or Firm* — Lewis Kohn & Walker LLP; David M. Kohn

(57) ABSTRACT

A system for enabling self-service access to fitting rooms or a cluster of fitting rooms for trusted shoppers while restricting access by non-trusted shoppers in a retail environment, comprising: a) providing an individual fitting room or cluster of fitting rooms further comprising a restriction point at which access is restricted; b) providing a means of uniquely identifying an individual attempting to access the fitting room or cluster of fitting rooms; c) providing a means of automatically enabling access to the fitting room or cluster of fitting rooms; d) providing one or more sensors for identifying fitting room behaviors of the individual; e) measuring the fitting room behaviors of the individual during a time when the individual is in proximity of or interacting with the fitting room or cluster of fitting rooms; f) assessing whether the fitting room behaviors of the individual are suspicious or not relative to a set of suspicious event thresholds; g) storing the individual and the fitting room behaviors of the individual as accessible records in at least one database; and h) providing an algorithm which determines future access privileges of the individual to the fitting room by analyzing their historical behaviors.

22 Claims, 6 Drawing Sheets

Related U.S. Application Data continuation-in-part of application No. 17/870,646, filed on Jul. 21, 2022, now Pat. No. 11,887,131, which is a continuation-in-part of application No. 17/737,404, filed on May 5, 2022, now Pat. No. 11,599,891, which is a continuation of application No. 17/567,765, filed on Jan. 3, 2022, now Pat. No. 11,631,089, which is a continuation of application No. 17/197,951, filed on Mar. 10, 2021, now Pat. No. 11,216,827, which is a continuation of application No. 16/940,168, filed on Jul. 27, 2020, now Pat. No. 11,182,803.

(60) Provisional application No. 62/878,747, filed on Jul. 26, 2019.

(51) Int. Cl.
| | | |
|---|---|---|
| *G06K 7/10* | (2006.01) | |
| *G06K 7/14* | (2006.01) | |
| *G06Q 10/105* | (2023.01) | |
| *G06Q 50/26* | (2024.01) | |
| *G07C 9/00* | (2020.01) | |
| *G07C 9/33* | (2020.01) | |
| *G07C 9/37* | (2020.01) | |
| *G07C 9/38* | (2020.01) | |

(52) U.S. Cl.
CPC ....... *G06K 7/10415* (2013.01); *G06K 7/1413* (2013.01); *G06K 7/1417* (2013.01); *G06Q 10/105* (2013.01); *G07C 9/00563* (2013.01); *G07C 9/00571* (2013.01); *G07C 9/00912* (2013.01); *G07C 9/33* (2020.01); *G07C 9/37* (2020.01); *G07C 9/38* (2020.01); *G06Q 50/265* (2013.01)

(56) References Cited

U.S. PATENT DOCUMENTS 11,599,891 B2 * 3/2023 Budano .................. G06F 16/75
11,887,131 B2 * 1/2024 Budano .................. G07C 9/38

* cited by examiner

SYSTEM PROVIDING SELF-SERVICE ACCESS TO LOCKED FITTING ROOMS

CROSS-REFERENCE TO RELATED APPLICATIONS

This application is a Divisional of U.S. patent application Ser. No. 17/987,728 filed Nov. 15, 2022, which is a Continuation-In-Part of U.S. patent application Ser. No. 17/870,646, now U.S. Pat. No. 11,887,131, which is a Continuation-In-Part of application Ser. No. 17/737,404 filed May 5, 2022, now U.S. Pat. No. 11,599,891, which is a Continuation of U.S. patent application Ser. No. 17/567,765 filed Jan. 3, 2022, now U.S. Pat. No. 11,631,089, which is a Continuation of U.S. application Ser. No. 17/197,951 filed Mar. 10, 2021, now U.S. Pat. No. 11,216,827, which is a Continuation of U.S. application Ser. No. 16/940,168 filed Jul. 27, 2020, now U.S. Pat. No. 11,182,803, which claims the benefit of priority from U.S. Provisional Patent Application No. 62/878,747 filed Jul. 26, 2019, the entire contents of which are herein incorporated by reference.

BACKGROUND OF THE INVENTION

There is a universal paradox in retail stores, the better you protect your merchandise from theft, the greater the impact these protections have on the customer experience and ultimately product sales. In their effort to reduce theft, retailers place restrictions on access to merchandise, limit use of the fitting rooms and bathrooms, and use labor to monitor self-checkouts and other retail conveniences impacting the vast majority of legitimate shoppers. The typical outcome is retailers inconvenience 99% of legitimate shoppers to stop theft from the 1% who come into their stores to steal. For example, a common method of reducing theft in a retail environment is to secure high-value merchandise by locking it up in a cabinet or other limited access merchandise fixture that makes it difficult for legitimate shoppers to access the product. To complete a purchase, the shopper must locate a store associate to unlock the fixture, gain access to the merchandise, and ultimately purchase the desired item(s). This process is not only costly and labor intensive for retailers, but it's time consuming, frustrating, and inconvenient, for the shopper, which nearly always leads to a horrible customer experience. This locked fixture approach has existed for year, virtually unchanged, and remains a significant problem for retailers. One of the goals of this invention is to modernize this outdated approach and to provide retailers with a means of protecting merchandise from theft, while creating virtually open access to this high value merchandise by legitimate shoppers, arguably providing retailers with the best of both worlds.

The recent trend of people willing to trade privacy for convenience is advantageous to the invention. More and more people willingly surrendering personal information to more easily access their phones, ATM's, board airplanes and other services. This invention capitalizes on this trend by requiring shoppers to provide personal identifying information in exchange for various conveniences including unfettered access to merchandise. This concept is known as the "Value Exchange". The Value Exchange implies that a consumer will trade personal identifying information for convenience. Examples include, access to locked merchandise, use of a locked fitting room, use the self-checkout, use of the locked rest room, and other conveniences. A typical example would be a shopper desiring to purchase high-value merchandise secured inside a locked liquor cabinet. Without this invention, the shopper would have to track down a store associate who has to locate the key to open the cabinet and access the goods. This cumbersome, time consuming, and inconvenient process typically results in a loss of 25% to 50% of sales; all this shopper inconvenience, lost sales, and unproductive labor to thwart theft from 1% of the shoppers. Using this invention, a shopper approaching the same locked liquor cabinet provides identification by some means, such as facial recognition, a cell phone number, loyalty card number, the use of the retailer's app or some other personal identifying information, and the cabinet automatically unlocks. So long as this same shopper doesn't exhibit suspicious behavior, as described in this disclosure, the cabinet automatically opens each time this shopper returns.

While locking or otherwise securing merchandise reduces or even eliminates theft, it also suppresses legitimate sales due to the inconvenience of or even inability of the shopper to obtain required assistance when and where needed. This inconvenience causes a significant percentage of shoppers to abandon the purchase. The value of these lost sales often exceeds the savings realized by preventing theft. Even worse, shoppers significantly inconvenienced in a store often adversely impacts loyalty (i.e., a regular shopper may choose to switch to a competitive store for future shopping trips), representing a far larger loss than the missed sale of the protected item.

Given this tension between theft and sales losses, retailers often choose sales preservation over loss prevention. It is simply more financially advantageous to suffer theft losses rather than sales losses caused by securing theft-prone merchandise. This invention fundamentally eliminates this tension. It allows product protection from theft even while enabling free access to merchandise by trusted customers. In short, retailers no longer have to choose between protecting products from theft and reducing sales. Instead, legitimate shoppers are provided ready access to protected merchandise while such automatic access is denied to individuals deemed "untrusted" by the retailer. The self-service system described in this invention enables retailers to implement effective loss prevention measures which no longer adversely impacts merchandise sales or the shopping experience. Further, the invention supports loss prevention measures that mitigate both opportunistic shoplifting (typically an individual stealing an item) as well as multi-item sweeps (theft of many items at the same time) typically committed by booster teams as part of large-scale organized retail crime operations.

While the above antitheft scenario inspired the invention, it can also be used advantageously in other situations in which identified individuals that exhibit desired behaviors are rewarded with unfettered access to merchandise or other privileges.

In addition to the sales recovery and customer experience advantages provided by the invention, there are significant labor savings achieved by allowing customers to self-service locked merchandise. A typical transaction requiring a store associate to respond to a customer request to unlock a case can require up to 10 minutes of "task interruption" time for the store associate. From responding to the customer, locating the key, unlocking the cabinet and allowing the customer to shop the case, and then returning to tasking, this often takes 10 minutes. 10 minutes of store associate time is equivalent to ~$2.50 tp $5.00. This cost along with the lost productivity can easily eliminate any profit from merchandise sold in the locked fixture.

Finally, lost keys and re-keying of locked cases is a real problem in retail. Employees misplace keys, they bring them home after their shift, and the mechanism eventually wears out. This not only causes lost sales due to then inability to access the merchandise, but the cost of re-keying fixtures is significant.

SUMMARY OF THE INVENTION

In one of the primary embodiments, the invention provides for a system providing self-service access to locked merchandise comprising: (a) providing a fixture that restricts access to the locked merchandise, wherein the fixture can automatically lock or unlock, allowing or restricting access to the locked merchandise; (b) providing a means of uniquely identifying an individual attempting to access the merchandise; (c) measuring a set of behaviors of the individual during any time the fixture is an open mode; (d) assessing whether the set of behaviors of the individual are suspicious or not relative to a set of suspicious event thresholds; (e) storing the individual and their set of behaviors as accessible records in at least one database; and (f) providing an algorithm which determines future access privileges of the individual to the enclosure based on a set of variables. Preferably, the fixture admits or restricts access based on a trusted shopper score assigned to the individual when compared to a trusted shopper score threshold. Most preferably, the trusted shopper score increases when the individual exhibits normal behaviors and the trusted shopper score decreases when the individual exhibits suspicious behaviors. Optionally, at least one database is selected from the group consisting of a customer, a VIP customer, a known offender, a banned customer, a store associate, merchandise vendor, security personnel, and other. Preferably, the system assigns the individual's behavior as either normal or suspicious by comparing the set of behaviors of the individuals relative to interactions with the merchandise contained in the fixture or their interactions with the fixture itself against the set of suspicious event thresholds. Most preferably, the system is capable of deploying a set of real time deterrents once a suspicious behavior threshold is crossed.

In another aspect, the means of uniquely identifying the individual is at least one selected from the group consisting of biometric identification methods, RFID, NFC, bar codes, QR codes, user ID and Passwords, credit or bank cards, driver's licenses, smart phone App's, and cell phones. Alternatively, the fixture restricts access to the merchandise in the fixture through restricting access to the merchandise relative to the individual until access is granted. Preferably, the system further comprises at least one sensor to track and monitor the set of behaviors from the individual.

In yet another aspect, the individual can be associated with a classification of at least one selected from the group consisting of a customer, a VIP customer, a known offender, a banned customer, a store associate, merchandise vendor, security personnel, and other class of user. Preferably, the suspicious event threshold can be determined based on the classification of the individual. Alternatively, individuals classified as authorized store associates have suspicious event and trusted shopper score thresholds set to allow stocking of the fixture without such behavior being classified a suspicious behavior. Preferably, if a request to open the fixture is made by certain high risk classes of individuals, then the system will transmit a class specific response comprising sending a unique identifier (UID) to a store associate. Optionally, a class of individual can be denied access for a specified period of time. Preferably, the suspicious behavior threshold can be automatically set based on a statistical analysis of past behaviors from a number of individuals. Alternatively, a local deterrent is deployed in real time when the suspicious event threshold is crossed. More preferably, the system will transmit a class specific response comprising sending a unique identifier (UID) to a store associate if a request to open the fixture is made by certain high risk classes of individuals. Optionally, a user of the system can enroll known offenders, store associates, vendor personnel, and security personnel into its individual classification database.

Finally, the invention can operate without behavior monitoring or storing of any user specific data. In this minimum embodiment, the invention requires users to identify themselves. This method of self-identification can used as the sole deterrent without behavior monitoring or storing transaction data. Under this scenario, the invention would not be able to keep track of a user's historical behaviors at the invention and therefore could not make decisions about future access solely based on behaviors while utilizing the invention. However, the personal identifying information entered to access the convenience could be correlated with other information related to the personal identifying information. An enhancement to this embodiment adds behavior monitoring and alarming when suspicious behaviors are detected. A further enhancement adds storing of each individual's transaction history in a database allowing the individual to be prevented from self-service access in future attempts following detection of a suspicious behavior or pattern of behaviors. Finally, in the full-featured embodiment, individual's historical behavior data is stored in a database and analyzed to identify suspicious behaviors or suspicious patterns of behavior to create a trusted shopper score. Each of these embodiments can be operationalized individually or in combination, allowing for a flexible system of deterrents to be deployed to optimize effectiveness at the lowest cost to deploy.

The primary purpose of the invention is to maximize sales while minimizing theft and labor costs. It also maximizes convenience and improves the shopping experience for the vast majority of legitimate shoppers while selectively denying unsupervised merchandise access by likely shoplifters. The invention intelligently enables and disables real time deterrents based on a given shopper's past behaviors and other variables. By uniquely identifying each shopper at a merchandise display fixture and simultaneously observing and recording their behavior, the invention can determine if future product access will be granted to that shopper. Once a shopper exhibits suspicious behavior, anti-theft real time deterrents are deployed during the event, and also during subsequent visits. For example, a legitimate shopper will be granted free access to a locked merchandise cabinet while an "untrusted" individual is denied unsupervised access. This is accomplished by uniquely identifying the person (though not necessarily "by name") and determining if past behavior or other factors warrant granting that person access to the merchandise. Once access is granted, the invention may trigger local alarms or real time store personnel notification if the shopper exhibits suspicious behaviors resembling theft events in progress. The invention draws upon several methods for uniquely identifying shoppers requesting access to protected merchandise, and several other methods for identifying behaviors or patterns of behavior deemed normal, undesirable, or suspicious. By coupling the elements of personal identification, product movement sensing technologies, database correlations, and algorithms, access to protected merchandise or a range of other applications can be optimally managed.

In certain configurations, the restricted access fixture may contain multiple locked fixtures which are coupled to a single customer facing User Interface and or local controller. This centralized controller provides a single point of individual authentication and facilitates access to the all the associated locked fixtures. Using one method of accessing the multitude of locked cases, the central authentication controller would authenticate the individual requesting access to the locked fixtures as a trusted shopper, once authenticated, all locked fixtures coupled to that controller would open. Once the shopper opens one of the coupled fixtures, the other locked fixtures would re-lock. In another embodiment, the user can select a specific locked fixture of the multiple locked fixtures to access, and only that specific fixture would be opened. For all these multi-locked fixtures use cases, the normal authentication processes, suspicious event detection processes, deterrent activations, employee notifications etc. which are utilized in a single locked fixture configuration would be utilized in this multi-case configuration.

It should be noted that the self-service authentication methods used to access to locked merchandise practiced by this invention are optional and are accessed on an "opt-in basis". Any customer who is uncomfortable utilizing these identification and authentication methodologies or is uncomfortable trading personal identifying information in exchange for self service access to locked merchandise may simply summon a store associate through the system and the store associate can provide access to the locked merchandise.

Other Applications for the Value Exchange, Behavior Monitoring and the Trusted Shopper Score This invention has other applications where the value exchange, behavior monitoring, and the Trusted Shopper Score can be used to grant or deny certain privileges. Past behaviors associated with an individual can be analyzed to establish a "Trusted Shopper Score" (TSS). This TSS is analogous to a credit score which analyzes historical credit behavior to assigns a credit score to an individual. The TSS algorithm analyzes historical behaviors associated with an individual and assigns a "trust" score based on certain individual behaviors or patterns of behavior. These patterns of behavior are compared to the general population's behaviors, and deviant behaviors have the effect of reducing the individual's TSS. Since the invention correlates uniquely identified individuals with their behaviors, it can also be utilized at other applications where individuals trade personal identifying information for certain conveniences such as fixed self-checkout stations, fitting rooms, bathrooms, as well as self-checkout via the shopper's mobile devices (mobile checkout). The invention can be used as a sensor to identify "trusted shoppers" who have exhibited repeated good behaviors as well as "untrusted shoppers" who have exhibited a pattern of suspicious behaviors in the past. In fact, an individual's TSS developed from one application can be used to allow or deny access to shopper conveniences in another application. For example, an individual's TSS can be based on that individual's behaviors at locked cases. That same individual's TSS can be used to grant or deny access to other applications such as the self-checkout, fitting rooms, rest room access, or other conveniences or activities where trust is important.

Self-Checkout Application

As used herein, the terms "fixed self-checkout" and "mobile checkout" are used interchangeably and are referred to collectively as "self-checkout." For the self-checkout or mobile checkout embodiments of this invention, the shopper would follow a very similar process as when they access the locked case embodiment to access the self-checkout. In effect, they would be trading personal identifying information in order to gain a privilege or convenience such as access to locked merchandise or access to a self-checkout.

1) The shopper would opt-into the self-service checkout or they could opt out and presumably receive an assisted self-checkout.
2) After opting in, the shopper would provide some form of personal identifying information to gain access to the self-checkout (described elsewhere in this specification).
3) The system would use their personal identifying information to look up their trusted shopper score (assuming they are not a first-time user).
4) First time users are granted access to establish their trusted shopper score.
5) If the shopper is above the trusted shopper score threshold, they are granted access to the self-checkout.
6) If the shopper is below the trusted shopper score threshold, they would be denied access and optionally, a store associate would be notified to assist the customer in checking out.
7) While the shopper is performing the self-checkout by scanning merchandise, one or more sensors are monitoring their behavior. These behaviors can include the following: The number of total interactions with the system, the number of interactions which are deemed suspicious, the number of interactions deemed to be non-suspicious, items moved through the scanning area but not scanned and then placed in the bagging area, items not moved through the scanning area and not scanned, scanning items with a price from a lower cost item, scanning an item and then placing a different item of the same weight in the bagging area, scanning all items but then not completing payment, walking through the self-checkout area without stopping at a scanning station, purposefully not scanning an item using their cell phone in a mobile self-checkout scenario, plus several other fraudulent behaviors designed to either pay a lower price or outright steal the items by not paying.
8) The system stores shopper behaviors in a database for each use of the self-checkout.
9) Statistical models are employed against historical shopper behaviors to establish the threshold between normal and suspicious self-checkout behaviors. Often times, a mis-scanned item is not malicious or intended to commit fraud, it may simply be user error. In this case, users are allowed to miss a scan, as long as they correct it once notified of the error in scanning. These behaviors may be deemed suspicious; however, they may not affect your trusted shopper score or may have a minimal effect since many self-checkout customers commit these errors.
10) If a shopper exhibits behaviors that exceed the suspicious behavior threshold, that transaction is deemed suspicious and stored in the database.
11) An algorithm is utilized to analyze individual shopper's historical self-checkout behaviors to create a trusted shopper score.
12) An individual's historical self-checkout behaviors are compared to other shopper's behaviors and using the algorithm, their trusted shopper score is calculated.
13) An individual's trusted shopper score is negatively impacted when the shopper creates a suspicious event by exceeding the suspicious event threshold and positively impacted by exhibiting normal self-checkout behaviors.

In this embodiment, the present invention provides for a system for enabling trusted shoppers to access self-checkout while restricting non-trusted shoppers in a retail environment, comprising:
(a) providing a means of uniquely identifying an individual attempting to access the self-checkout;
(b) providing one or more sensors for identifying self-checkout behaviors;
(c) measuring a set of behaviors of the individual during a time when the individual is in proximity of or interacting with the self-checkout;
(d) assessing whether the set of behaviors of the individual are suspicious or not relative to a set of suspicious event thresholds;
(e) storing the individual and their set of behaviors as accessible records in at least one database; and
(f) providing an algorithm which determines future access privileges of the individual to the self-checkout by analyzing their historical behaviors. Optionally, the set of behaviors measured is at least one selected from the group consisting of items not passed over the self-checkout price scanner, items not scanned but passed over the scanner, items scanned but the price and or barcode does not match the merchandise scanned, scanning all items but then not paying, being shown a scanning error and not correcting the error, scanning a low cost item and placing a higher cost item in the bagging area, the number of total transactions, the number of suspicious events, the number of non-suspicious events, having items in your cart which were not scanned via mobile checkout, and any other behavior intended to fraudulently receive merchandise without paying or without paying the actual price of the merchandise. Preferably, the set of behaviors from each self-checkout interaction event comprises shopper behavior data and is stored in the at least one database. Most preferably, statistical models are applied to the shopper behavior data to calculate the set of suspicious event thresholds that delineate normal shopping behaviors from suspicious shopping behaviors. Alternatively, statistical models are applied to an individual shopper's behavior data to create a trusted shopper score for the individual shopper. More preferably, historical shopper behavior data is used to establish at least one threshold for the trusted shopper score. Optionally, other shopper data unrelated to the shopper behavior data can be included in the calculation of the trusted shopper score. Similarly, the other shopper data unrelated to the shopper behavior data comprises at least one selected from the group consisting of historical purchase behaviors, return fraud behaviors, prior-theft incidence, police reports, credit scores, case management systems, and other data related to the shopper purchases or theft behaviors. These thresholds can also be set manually. Most preferably, shoppers whose trusted shopper score crosses the at least one threshold of the trusted shopper score would affect their access privileges to the self-checkout. In another aspect, the set of suspicious event thresholds are periodically updated by the statistical models as additional shopper behavior data is collected by the system. Preferably, at least one sensitivity variable is used to adjust the calculation of the set of suspicious event thresholds. In yet another aspect, the at least one sensitivity variable corresponds to a percentage of shoppers estimated to be offenders or a database of risk factors associated with a store.

This Trusted Shopper Score algorithm, whether used for the Locked Case or the any other application of the TSS, can also utilize Artificial Intelligence and Machine Learning algorithms to identify "patterns of behaviors" within the individual's historical behavior. Individual behaviors which are suspicious in isolation are not necessarily enough to deteriorate a TSS below the threshold. However, a pattern of behaviors taken collectively may have a larger effect than taking each behavior individually. This effect can be both affect the TSS positively or negatively. Examples include shopper A who exhibit a number of non-suspicious behaviors and then exhibits two or three suspicious behaviors followed by non-suspicious behaviors would remain a trusted shopper. This pattern can be compared to shopper B who initially utilizes the system and their first three transactions are suspicious, this shopper B's trusted shopper score may immediately deteriorate below the TSS threshold whereas shopper A's TSS may not be as impacted. As a result, the algorithm utilizes artificial intelligence to recognize patterns within an individual's behavior that affect their trusted shopper score either positively or negatively.

Alternatively, shoppers who have been denied access to the self-checkout due to their trusted shopper score can get reinstated by providing at least one selected from the group consisting of additional identifying information, financial information, a deposit, and other form of increased security for the retailer or some form of financial guarantee for the retailer.

Fitting Room Application and Use of the Value Exchange and Trusted Shopper Score The TSS can be used at other high-risk applications where trust is important. The fitting room cluster is an area in apparel stores where most purchase decisions are made, however, it is also the location where the majority of apparel theft occurs. Would-be thieves enjoy the privacy and seclusion of fitting rooms to remove tags and conceal merchandise. These high-risk locations are excellent examples of where the Value Exchange and the TSS could be used to grant or deny access to conveniences such as the dressing room. In this embodiment, the invention relies on the Value Exchange and the TSS.

In an enhanced embodiment, a TSS either from using other instances of the invention in other applications, or through correlating their identifying information with other third-party databases which contain data which can validate the user's "trustworthiness", can be used to intelligently grant or deny access to the fitting room or fitting room cluster.

Given their risk, fitting rooms are generally locked or staffed with a store associate. When locked, they require a store associate to unlock the fitting room. In all cases, shoppers are inconvenienced leading to lost sales and unproductive labor is utilized which increases retailer's costs. Ideally, retailers would prefer shoppers to self-serve access to restricted fitting rooms while at the same time protecting merchandise from theft. The invention solves for both of these requirements. By requiring shoppers to identify themselves prior to granting access to the fitting room, would-be thieves are far less likely to steal after just identifying themselves. This deterrent is enough to manage shrink while enabling self-service access to fitting rooms.

In a more advanced embodiment, the invention can combine the benefits of the value exchange (requiring shoppers to identify themselves prior to granting access) with behavioral monitoring and the Trusted Shopper Score.

Behaviors which can be monitored while a shopper is in the fitting room are as follows:
1) Monitoring merchandise which is brought into the fitting room using RFID
   a. How many items were brought into the fitting room
   b. Unauthorized merchandise brought into the fitting room such as electronics or jewelry
2) Identifying when high flux magnets are attempted to be brought into the fitting room. High-flux magnets are using to detach security tags from merchandise
3) Excessive dwell in the fitting room Operating sequence: In its simplest embodiment, a shopper approaches the fitting room which has restricted access by either being restricted at each fitting room or have some means of restricting access at the entrance to the fitting room cluster. The entrance to the fitting room cluster is that location where a single point of entry or egress to multiple fitting rooms is located. This single point of entry allows access to the cluster of fitting rooms to be restricted at a single point. This access restriction can be through the use of a door with magnetic locks or solenoid locks, turnstiles, gates, software defined virtual fences or any other means of restricting access. All of these restriction methods described above should also have a means to autonomously restrict access to the fitting room or fitting room cluster following an access event. And access event is defined as any time an individual successfully gains access to the fitting or fitting room cluster.

At fitting rooms, often times multiple individuals can request access as a group, such as a group of friends who are shopping together. In this scenario, the invention needs to grant access to this group rather than individually granting access which would not be a good customer experience.

As the individual approaches the restricted access point, the user is confronted with the value exchange, they must provide the system with some form of personally identifying information to gain access to the fitting room or cluster of fitting rooms. This information can be entered via a centralized touchscreen display, by the user's mobile device, via a QR code which accesses a web page or via an App, or scanning a card which contains a QR or Bar code containing the users personal information. There are many ways users can provide the system with personal identifying information which are described in detail elsewhere in this specification. After arriving at the point of restriction, the user is asked to provide the system with their personal identifying information using one of these identifying and data entry methods. Once the user identifies themselves, they can either specify a fitting room they would like to enter using the fitting room identifier, or are directed to a fitting room that is selected by the invention (assuming they are at the entrance to the fitting room cluster), and access to that fitting room is remotely enabled. This method relies on the system knowing the occupancy status of each fitting room and providing the user with a fitting room which is currently unoccupied. Once inside the fitting room, the user could use a simple latch to prevent other shoppers from entering their fitting room.

As it relates to the embodiment of the fitting room cluster, the system shall allow individuals who have successfully gained access, to exit the fitting room cluster without restriction. This should be designed in a way as to not allow unauthorized individuals to enter the cluster. This can be accomplished by a sensor detecting the entry or exit trajectory to automatically unrestricted access to the exit. Alternatively, the invention could utilize one-way turnstiles or other unidirectional devices that allow exit but not entrance to a restricted area.

In the preferred embodiment, the user is authenticated by providing their personal identifying information, the system then enables access at the point of restriction which in this case is the entrance to the fitting room cluster. Once inside the point of restriction, the user has access to all fitting rooms which are unoccupied in the cluster which are not restricted and as such the user can freely choose to occupy any available fitting room. This embodiment is preferred as it minimizes system complexity and cost to deploy. It has the added benefit of allowing the user to enter and leave the fitting room as many times as they like. This is desirable since fitting room users often time are trying on clothes with a friend with whom they would like to show the apparel they are trying on and get their opinion. Users also like to see themselves in a 3-way mirror and this method allows them to depart the individual fitting room in the cluster and then subsequently return without having to re-enter their personal identifying information. Since the point of restriction, and therefore the point of authentication, is at the entrance to the fitting room cluster, once the user is inside the restriction point, they can move about freely, select any fitting room with is unoccupied, and enter and leave their fitting room as they like as long as they don't depart the restriction point. Finally, this approach eliminates the need to lock each fitting room and to determine occupancy of each fitting room in the cluster. In yet another embodiment, if the user is attempting to access an individual fitting room, that specific fitting room unlocks after the user provides the system with their personal identifying information and is authenticated. Thieves do not like to identify themselves just before stealing so in this embodiment, self-identification serves as the sole deterrent against theft inside the fitting room.

An enhancement to this embodiment would be to add the Trusted Shopper Score in addition to the value exchange to the following embodiment. In this embodiment, the fitting room is equipped with sensors that identify behaviors and statistical models to determine what behaviors constitute suspicious behaviors. These sensors can include RFID readers which can identify authorized and unauthorized merchandise entering the fitting room area, high-flux magnets which are used in security tag detachers, dwell sensors which can identify when a shopper is lingering in the fitting room too long, metal detectors which can identify when a shopper is brining foil lined bags which can defeat security tags. All these sensors can provide the system with information about suspicious events which would trigger that user's TSS to deteriorate.

In another embodiment, shoppers who possess a trusted shopper score either from using other instances of the invention in other applications, or through correlating their identifying information with other databases which contain data which can validate the user's "trustworthiness", are granted access to the fitting room. Those who cannot be validated are assisted by a store associate.

Some other considerations of this embodiment of the invention include: 1) how to enable shoppers to exit and re-enter the fitting room. This happens when a 3-way mirror is located in the cluster or the shopper would like to show the apparel to a friend shopping with them. 2) how can store associates access the fitting room. This can be accomplished by store associates entering their employee number or some simple access code like the store number. 3) the system cannot allow access to an individual fitting room which is occupied. Ideally, the system would be aware of the occupancy status of an individual fitting room via a sensor of some kind before granting access to ensure user privacy (assuming the system is granting access to an individual fitting room versus the entrance to the fitting room cluster). The system should only grant access when the fitting room is unoccupied. This can be accomplished using a motion detector or other form of occupancy sensing technology 4) how does the method for restricting access automatically restrict again after each use. In other words, the system needs to resecure the restriction point after each opening event. For example, assuming the method of restricting access is a magnetic lock or solenoid lock, for the system to operate properly the door must close automatically after each use. In these cases, the system should enable the shopper to re-enter the fitting room after temporarily exiting the point of restriction, the system can enable access to the same person multiple times up to a programmable time limit. Store associates could use an App or enter their employee number to gain access. These methods are described elsewhere in this specification, and finally, all doors, gates, turnstiles etc, must have a mechanism to automatically restrict access after granting access.

The system also has a mechanism for deploying a local audio and visual alarm and for alerting store associates if a suspicious event is detected. In addition to local alarming, the system can also notify store associates via any communication method utilized in the store such as the PA system, 2-way radios, smart devices, or other communication devices utilized by store associates.

The system can be linked to the video recording system such that when a suspicious event is detected, the invention can bookmark the video management system to capture on video any concealment into typical theft enclosures like backpacks or large purses. It can also capture video or articles brought into the fitting room and those taken out. Any discrepancy in the merchandise brought in versus those removed is an indication of those articles concealed in the fitting room.

This article count can also be accomplished via RFID or similar article surveillance techniques.

Rest Room Application

This same concept of the value exchange could be used for granting access to locked individual rest rooms or a cluster of rest rooms as described under the fitting room application. In this embodiment, the user is asked for personal identifying information, once validated, the user is granted access to the locked rest room via an automatically unlocking door. The rest room would require a restriction point at the entrance to the rest room cluster or at each individual rest room. The same locking mechanisms would be employed to automatically lock and lock access at the restriction point. The rest rooms could also include a rest room identifier allowing the user to identify the rest room they seek to enter. Or the system to automatically the rest room the individual is enabled to access. In an enhanced embodiment, a TSS either from using other instances of the invention in other applications, or through correlating their identifying information with other third-party databases which contain data which can validate the user's "trustworthiness", can be used to intelligently grant or deny access to locked rest rooms.

Preferably, the method of uniquely identifying a shopper is at least one selected from the group consisting of shopper loyalty card information, government issued ID, financial institution cards such as debit cards or credit cards, cell phone numbers, cell phones carried by shoppers which may have local connectivity as a means of identification, a retailer's App which the shopper is logged into, biometric information such as facial recognition, palm ID, finger print readers, or other forms of biometric identifiers, employee ID cards or employee numbers, or any other form of personal identifying information.

In yet another aspect, the system further comprises a real time notification or alarm feature if the set of behaviors of the individual are suspicious relative to the set of suspicious event thresholds. Preferably, the system comprises a means of recording a video or storing images of the individual accessing the self-checkout, the merchandise scanned and the area surrounding the self-checkout before, during and after the self-checkout transaction. In a more preferred aspect, the system further comprises a means of transmitting the video or image to a device viewable by appropriate personnel, including the shopper.

Typical Operating Sequence

While reasonable variations of the operating sequence may be implemented per the detailed description, the following represents a typical operating sequence of the invention using the locked case example.

First, a person desiring access to the locked merchandise fixture encounters a visual display adjacent to the locked fixture which presents the customer with two options, to either call an associate to unlock the fixture in the traditional way, or to use personal identification to enable self-service access to the locked fixture. The customer so indicates their choice by pressing a soft button on the touch screen display.

If the customer selects the self-service option, they are then presented a disclosure statement which provides "informed consent" for the system to utilize personal information for the purpose of unlocking the fixture. If the shopper opts-in and chooses the self-service option, the system takes a "mug shot" of the individual as they are entering their personal identifying information via the built-in camera. If the system is using biometrics such as facial recognition to uniquely identify the shopper, a visual and/or audible message then instructs the user to look directly at the camera typically located above the display. The display presents the customer with an image of the shopper from the embedded camera. The customer aligns their face with a box on the screen, thus providing a perfect "mug shot" of the individual. The system then compares the biometric information with a database of shoppers to determine if this individual is a "trusted shopper" and will be allowed access to the locked case.

Once the customer is determined to be a trusted shopper, the lock releases and the display indicates the fixture is open. The customer opens the case and removes the desired merchandise. The system counts the units removed from the fixture while open, how long the case is open, how many times the individual has accessed the case in various periods of time, and how often a shopper has accessed any system. The case then automatically locks once the fixture is closed utilizing the auto closing feature. The customer's personal identifying information merchandise removal, and other behaviors are data logged in the system database.

In the event the shopper exhibits a set of behaviors that exceeds a per-determined suspicious event threshold, the system can deploy local real-time deterrents and/or notify store associates.

If the shopper is a known offender or is a shopper who has exhibited repeated suspicious behaviors in the past, they will be denied self-service access to locked merchandise and the system notifies a store associate to open the locked fixture and provide "supervised access" to the locked merchandise.

In the case of denial of self-service access, a store associate is notified and once enrolled in the system, the store associate can use their own personal identifying information to unlock the case without the need for keys.

There are multiple methodologies for achieving the operating sequence described above and the detailed description that follows illustrates the various methodologies and sensor which can be used to achieve this operational sequence.

BRIEF DESCRIPTION OF DRAWINGS

The novel features of this invention, as well as the invention itself, both as to its structure and its operation, will be best understood from the accompanying drawings, taken in conjunction with the accompanying description, in which.

DETAILED DESCRIPTION OF THE INVENTION

Figure 1:
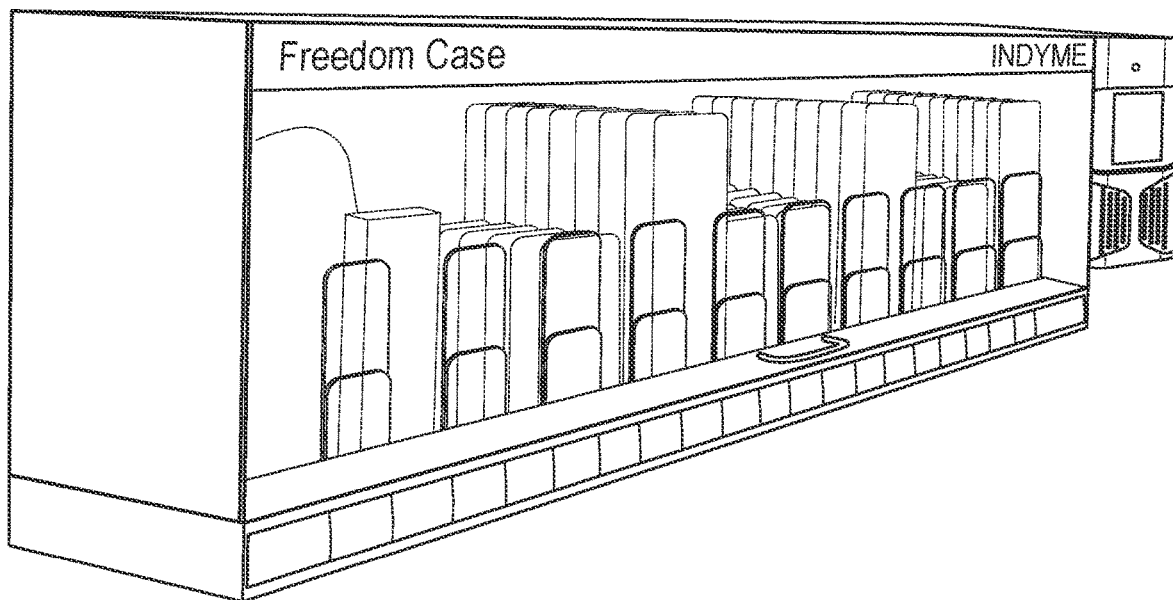
FIG. 1 illustrates an exemplary embodiment of a fixture with user interface of the present invention.
Figure 2:
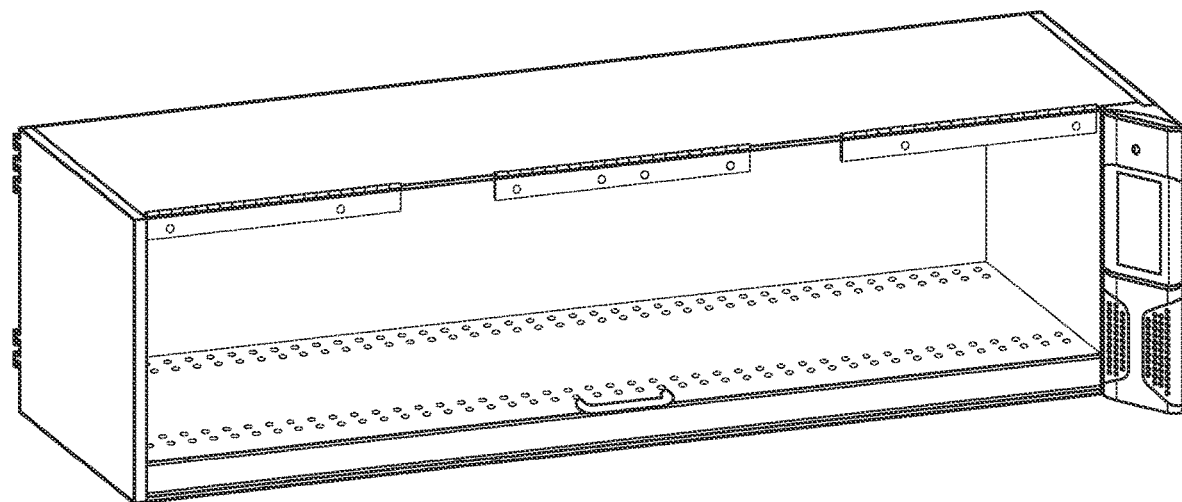
FIG. 2 illustrates an alternative exemplary embodiment of a fixture with user interface of the present invention.
Figure 3:
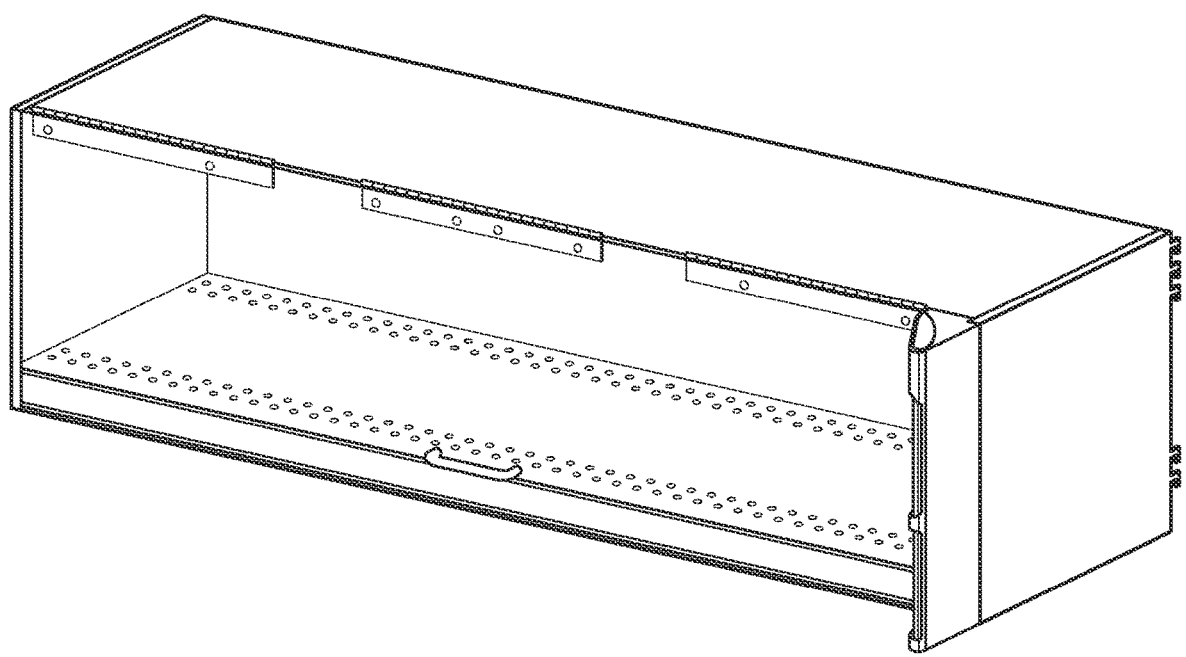
FIG. 3 illustrates an alternative view of the fixture of FIG. 2.
Figure 4:
FIG. 4 illustrates an alternative exemplary embodiment of a fixture with user interface of the present invention.
Figure 5:
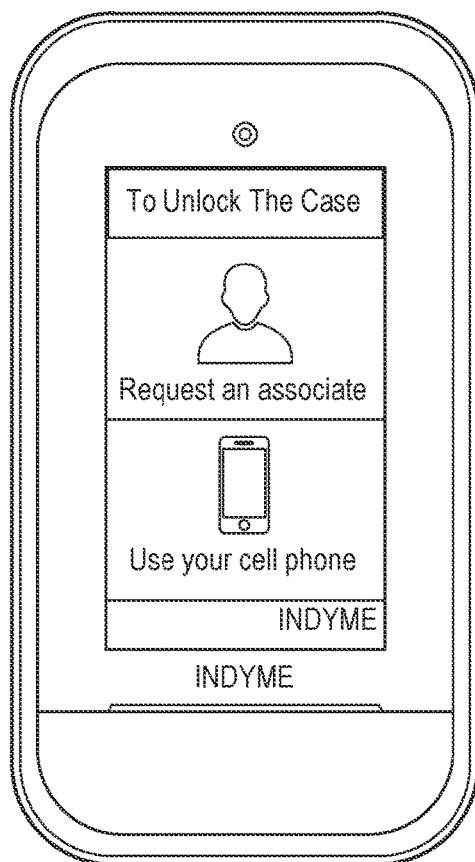
FIG. 5 illustrates an exemplary user interface of the present invention.
Figure 6:
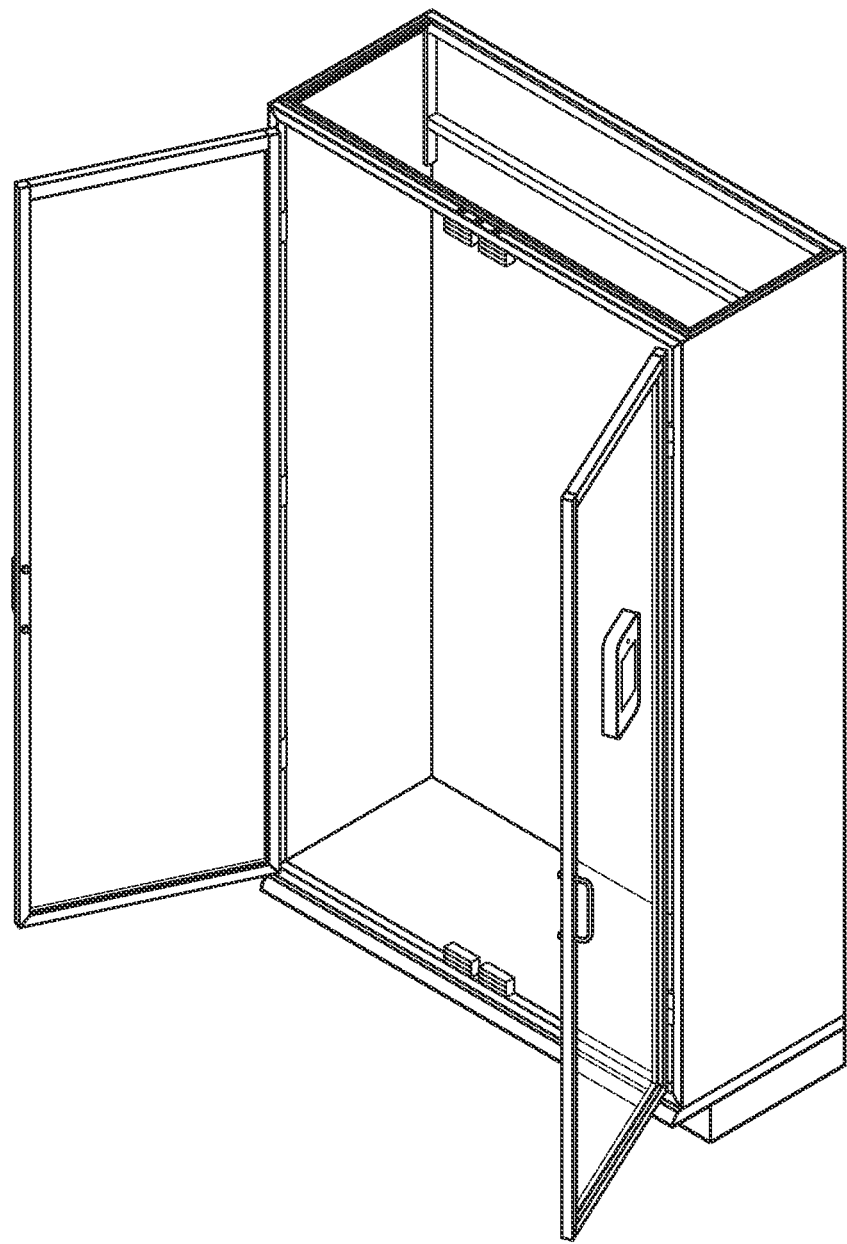
FIG. 6 illustrates an alternative exemplary embodiment of a fixture with user interface of the present invention.
Figure 7:
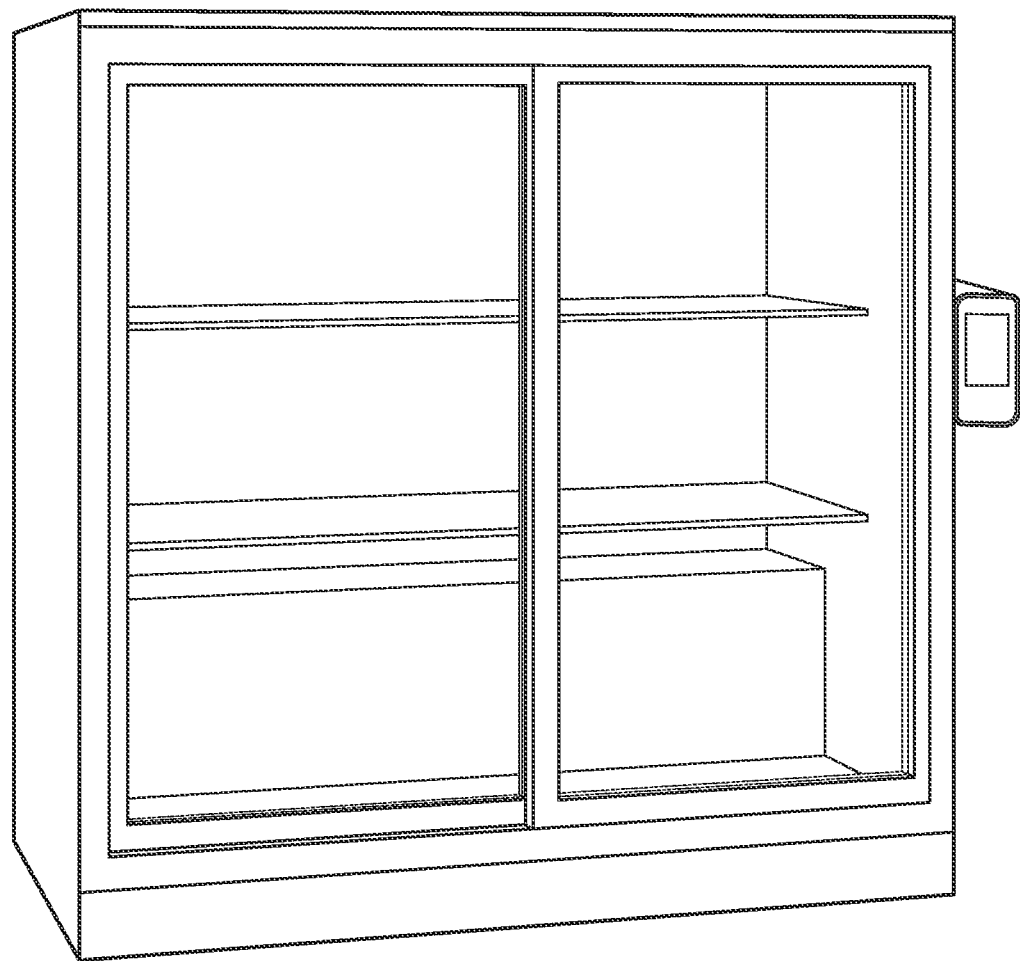
FIG. 7 illustrates an alternative exemplary embodiment of a fixture with user interface of the present invention.
Figure 8:
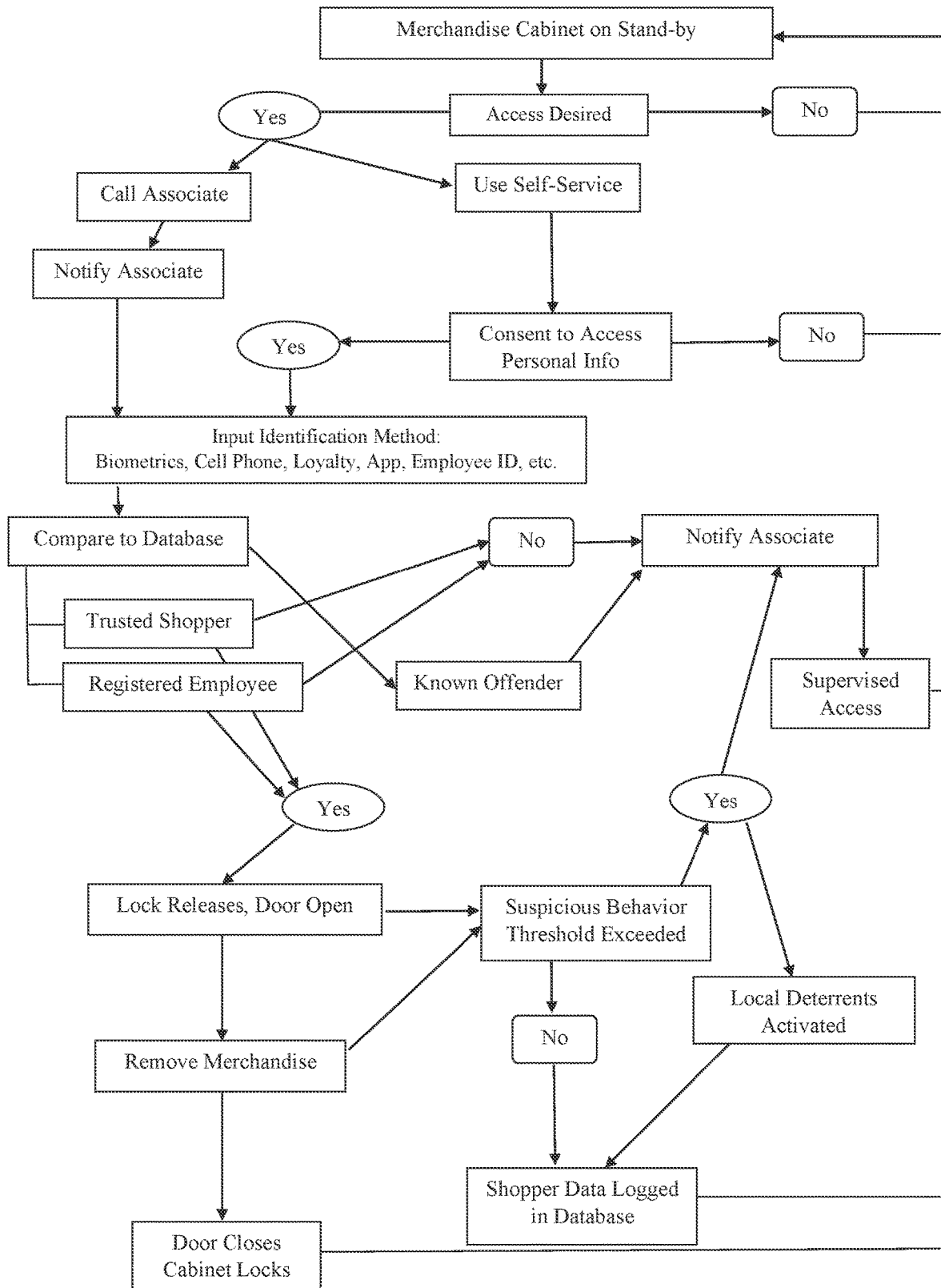
FIG. 8 illustrates an overview of the self-access system present invention.

The invention is best understood by first gaining insight into the types of sensors and devices which are coupled together to enable its operation. Keeping in mind that a specific attribute of the invention is that is the operation of the invention is not dependent on any one specific sensing or merchandise access restriction technology. Three categories of sensors and devices are typically integrated to operate the invention:

People identification sensors capable of uniquely identifying an individual;
Merchandise interaction (customer behaviors) sensors.
Real-Time Deterrents Merchandise protection and suspicious behavior notification devices;

Using the information and controllable access provided by these device categories, the invention determines if a given person is considered "trusted" and will be granted merchandise access. A more detailed description of each category follows.

Person Identification Sensors

In certain embodiments the invention requires a method of uniquely and repeatedly identifying each person for which the invention is considering granting access. As these access sessions may occur on different days, at different locations within the store, and even at different stores the identification method must remain accurate even when an individual's physical appearance changes. The invention also identifies store associates and allows them, once registered, access to merchandise for stocking purposes. The invention's core functionality does not require identifying the person "by name," though some ancillary benefits, described later, may be realized with this functionality. Finally, any method of identifying the user should also include a means of verifying the user is in fact in physical proximity to the invention, thereby eliminating the possibility the user is remotely accessing the invention.

Any method of identification meeting the above requirements are acceptable. These include but are not limited to:

Facial recognition using video cameras;

Other biometric methods, such as iris recognition, fingerprint detection, or any other biometric detection that can uniquely identify an individual;

RFID, Bar Code, static or dynamic QR Codes, or methods integral to a card or other device issued by the store (such as a loyalty cards selectively provided to customers by the store);

Government issued ID cards such as a driver's license, passport or trusted traveler card;

Financial institution cards such as debit cards, credit cards or other financial institution cards which can be a source of identification.

Cell phones carried by shoppers which may use local connectivity (e.g., WiFi, Bluetooth and/or NFC) as a means of identification;

Smart phones carried by shoppers that are logged in to the retailer's app (the login considered adequate proof of identification), using the onboard wallet which contains bank cards or credit card information as a source of identification;

Smart phones carried by users that could be used as a user interface to receive text messages from the invention with alphanumeric codes (after providing the invention with the user's cell phone number), scan QR codes provided by the invention to link to web pages or trigger an App, receive QR codes provided by the invention, or other combinations of the above elements to authenticate the user by establishing the user's identification.

Using onboard biometric identification capabilities on smart phones carried by shoppers, then relaying this confirmation to the invention via the retailer's App, by presenting the shopper's phone screen (displaying a QR or similar code) to the invention's camera, or via a text message; the transaction could be initiated on the shopper's phone resulting in identification confirmation to the invention or the shopper could scan a QR or similar code displayed by the invention to automatically launch the identification process and the installed retailer's App on the shopper's phone;

Smart phones carried by shoppers accessing a web site that performs biometric identification; this method does not require an installed retailer's App on the shopper's phone and could be automatically launched by scanning a QR or similar code at the fixture.

Employee ID cards which contain an employee number which uniquely identifies the employee. Employee access cards which could otherwise be used to access the building;

Any other device or method issued by the retailer which uniquely identifies the individual Location Confirmation of Identified Persons Some methods of person identification inherently confirm the physical presence of the person at the invention. For example, facial recognition by a camera at the fixture. However, some identification methods described above using the shopper's smart phone do not provide this assurance, making it possible to intentionally or accidentally unlock a fixture from a remote location, which is undesirable. Methods to confirm both the user's identity and also their physical location in such situations include but are not limited to:

Short Range Wireless Connectivity with Shopper's Smart Phone: Typically using Near Field Communication (NFC) or Bluetooth, both of which have limited range but NFC being the most suitable;

Location Based Services Detecting Shopper's Smart Phone: WiFi services providing "triangulation" methods;

Dynamic QR Codes: While a shopper's phone could scan a QR Code label affixed at the fixture location, a photo of that QR Code could be used at any time and any place to inappropriately trigger an unlock command. To avoid this, Dynamic QR Codes displayed by the invention, or a nearby discrete device, change periodically or even with every transaction.

Two step authentication: Entering a cell phone number into the invention and subsequently receiving a text message containing an alphanumeric access code or graphical QR Code. The alphanumeric code from the text message is subsequently entered into the invention by the user or the graphical QR code provided to the user is scanned by the invention from the user's mobile device. Once validated, the user is granted access.

Another two-step authentication method uses QR codes. In this embodiment, a static or dynamic QR code is displayed by the invention which is scanned by the user's mobile device. The QR code is linked to a web page which displays a user interface. The user enters their personal identifying information such as a cell phone number or other method of identifying themselves (described elsewhere in this specification) into this user interface to validate themselves. Once validated, the user is provided an alphanumeric code through text message, email or other communications means. After receiving the code, the user can then enter the code into the invention. Alternatively, the user is provided a unique QR code via the user interface on their mobile device which can be scanned by the invention. Once validated, the user is granted access. In another method, the user is logged into an App which is used to scan a QR code provided by the invention. The App is linked to the invention and provides the personal identifying information to the invention from the user's login credentials.

Merchandise Protection and Suspicious Behavior Notification Devices

The invention is typically used with one or more devices providing a means of securing and/or limiting access to merchandise or access to conveniences such as the fitting room, rest room, or self-checkouts. A requirement of these devices is a means by which control signals from the invention may allow or deny complete and/or limited access to the protected merchandise or access to conveniences. The possible types of devices that could meet this requirement are virtually unlimited; some examples include:

Locked Cabinets/Doors: Typically, an electronically activated locking device grants or denies access to the protected merchandise behind the door. These range from fully enclosed cabinets to flip doors in front of merchandise shelves to refrigeration doors opened to access beer or other high-theft merchandise;

Dispensing Display Fixtures: A wide variety of devices fit this category which includes: peg hooks with a knobbed spiral coil that must be turned to permit removal of one item at a time; push button devices that dispense one item when pressed (much like a vending machine); merchandise "pushers" that keep a facing of merchandise pressed tightly against the front of a shelf; and specialized fixtures (such as for canned baby formula) that rely on a specific form factor for limiting the number of units dispensed. Whether the operating mechanism is largely mechanical or electronic, all compatible devices can be controlled by the invention to permit (or not) dispensing of one or more of the protected products or, in the case of pushers, to disable the pushing function to limit access to merchandise.

Movable Fence: Any kind of sliding or pivoting fence that can be moved to gain access to the product.

Locked Fitting Room Doors: Any locked fitting room for which self-service access would be desirable via a controllable locking mechanism.

Locked Rest Room Doors: Any locked rest room for which self-service access would be desirable via a controllable locking mechanism.

Access to Fixed Self-Service Checkouts: Self-service checkouts where ideally only trusted shoppers could access. These self-checkouts would be equipped with the ability to identify the individual prior to enabling access to the self-checkout.

Access to Mobile Checkouts: Mobile checkouts where ideally only trusted shoppers would be granted access to this checkout method. These mobile self-checkouts would be equipped with the ability to identify the individual prior to enabling access to the mobile self-checkout.

Fixture Status Sensors

Fixtures used by the invention preferably would have sensor on the door/fence/dispensing mechanism which can detect the status of the fixture, namely, is the fixture "open" in the sense that merchandise can be accessed, or is it "closed" in the sense that access to the merchandise is restricted or is inaccessible in the closed state. The fence limiting access to the merchandise can also be a "virtual" fence defined in software and controlled by a camera. When the virtual fence is "closed" any penetration through the virtual fence would cause the invention to alarm. When the virtual fence is "open" the invention would allow penetrations through the virtual fence.

Real Time Deterrents

Anti-theft deterrent devices can be controlled by the invention including various communication, notification, and alarming devices. Using product removal information from internal sensors such as the merchandise movement sensors, fixture status sensor, camera tampering sensor, magnet detectors, dwell detectors, etc., to detect suspicious events the invention can trigger local deterrents such as notifying store personnel and/or activating local deterrence devices which may be local alarms, local voice announcements, flashing lights, audio such as PA announcements, turn on cameras, or any other traditional anti-theft deterrent device which would deter the offender from proceeding with the theft.

In one possible configuration, merchandise may not be physically protected from access but rather the invention notifies store personnel and/or activates local deterrence devices mentioned above when an "untrusted" person is detected interacting with or removing merchandise. Examples of this embodiment include facial recognition as the identifying method which does not rely on the individual to enter their personal identifying information but rather is collected automatically.

Customer Behavior Sensors, Merchandise Interaction Sensors

It is desirable, though not always required, that sensors inform the invention of the characteristics of the customer's set of behaviors including merchandise interaction by the identified individual accessing the merchandise. This may include the following detections (and possible invention characterizations):

- No merchandise removed (typically considered a non-event);
- One item removed, possibly including identification of the specific merchandise item (a normal shopper purchase);
- Multiple items removed within normal shopper patterns (likely not considered a suspicious event);
- Rapid or other abnormal removal of multiple items (a suspicious event).
- Multiple items removed of the same product beyond normal shopper patterns (likely a suspicious event)
- Replacement of product, as in a merchandise replenishment or stocking action by a store associate or simply a customer changing their mind about a purchase.
- Door open duration: how long the door is open after an individual is granted access.
- Frequency of visits to any locked case in the system. It is also considered suspicious of an individual access cases in the system too frequently even if each individual transaction is normal behavior.
- Concealment of merchandise once removed from the invention.
- Removal of a large number of items with one action (taking three or more items in your hand at one time and removing them from the invention).
- Purposeful tampering of the sensors or camera of the invention.
- Multiple failed attempts to access the invention.
- Using fraudulent credential to access the invention.

The invention is not dependent on any specific method of detecting these interactions or behaviors and it is to be understood that not all acceptable methods of detection are capable of providing all of the interaction characterizations listed above. The type of merchandise interaction sensor is typically determined and/or limited by the merchandise protection method used (e.g., locking case, peg hook, etc.). Generally, any sensor capable of providing at least some insight into the nature of merchandise interaction can be used by the invention. These sensors have the common capability of measuring product interaction and some have the additional capability of measuring inventory and specific product SKU level information. These sensing technologies include, but are not limited to, the following:

- Cameras (including 3D cameras) with integral or post-processing artificial intelligence capabilities able to detect merchandise interactions which may include detection of a hand. penetrations into an open fixture, and quantity of items held in a hand during removal; these cameras can also count the number of units before and after a transaction, thereby "netting" the number of items removed less the number replaced. These cameras could also be equipped with Artificial Intelligence capable of detecting the type of merchandise contained in the fixture down to the SKU level. This SKU data is a useful input to both the TSS algorithm, for stocking and replenishment purposes, and also for correlating items removed from the fixture with items subsequently purchased at the checkouts.
- Vibration sensors able to detect the movement of merchandise on/off shelves, peg hooks, and other displays;
- Switches (including magnetic switches and similar) detecting merchandise removal on dispensing display fixtures commonly known as pushers or smart peg hooks.
- Weight measuring pads that can determine the number of items on a shelf.
- Light detecting devices which can determine the location and number of items on a shelf.
- RFID tags which can be detected by a receiver and count units being removed from a fixture or being replaced. This technology can also uniquely identify the product down to the SKU level. This SKU data is a useful input to both the TSS algorithm and for stocking and replenishment purposes.
- Smart Fixtures: any fixture with sensing technology that can determine units being removed from a fixture and also the inventory position of each product contained in the fixture. This inventory data is a useful input for stocking and replenishment purposes.
- Sound detection: fixtures which detect an audible sound related to product removal.
- Door open sensors which can identify when and for how long the door to the invention are open.
- As individuals attempt to access the invention, their behavior during the authentication process is also monitored and stored in the database. These behaviors include entering fraudulent information, multiple failed attempts at gaining access, and defeating the cameras while attempting to gain access.
- Tamper detection: all of the above sensors can be configured to sense when an individual is attempting to tamper with the sensor, notifying the invention of any abnormal situation indicative of a tampering situation.

As noted previously, not all of these methods can reliably provide all possible merchandise interaction characteristics. However, the invention can be configured to optimize for best use of those characterizations that can be provided.

The Trusted Shopper Algorithm and Development of the "Trusted Shopper Score"

An individual's privileged access to secured merchandise or to certain conveniences is determined by an algorithm which takes as its primary input this individual's behavior during each access event. Based on the individual identification methodology utilized by the invention, the algorithm may have access to databases containing multiple additional attributes (,e. metadata) related to this individual which enable to the algorithm to consider these additional attributes to make more informed merchandise access decisions. These additional individual attributes are summarized in the section below entitled Shopper Metadata. This Metadata is used to place individuals into a "classification".

Past behaviors, combined with these Metadata attributes resulting in an individual's classification are inputs to the algorithm and are used to develop a Trusted Shopper Score or TSS. This TSS is a numerical score which can be compared to a programmable Trusted Shopper Score threshold set by the retailer as the basis for ongoing access to the invention. In fact, as different applications of the invention carries different risks of theft, the retailer could program each individual invention with its own unique TSS threshold based on that particular application.

Past Shopping Behavior and Trusted Shopper Score

Each time the individual demonstrates trustworthy behavior during an access event, the algorithm increases that person's TSS. Likewise, detected undesirable behavior (such as abnormal merchandise interaction activity and permitting "tailgating" or allowing other shoppers access to an open fixture) results in the reduction of that individual's Trusted Shopper Score. Once established, the Trusted Shopper Score is compared to a TSS threshold established by the retailer and as long as the individual remains above the threshold, future access privileges are maintained. If an individual's TSS drops below the threshold, the system will deny unsupervised access to the invention and will summon a store associate. For example, an aggressive TSS threshold might deny unsupervised access based on one suspicious merchandise interaction. In this aggressive example, a single incidence of unacceptable behavior effectively revokes that shopper's privileged access rights.

There are many reasons a retailer may not elect such an aggressive threshold. After all, retailers do not want to alienate loyal shoppers and often are more concerned about sales losses than theft losses. Since it is possible that acceptable behavior may occasionally be incorrectly perceived as unacceptable, a more lenient threshold could be warranted such that a complete loss of unsupervised access occurs only when a very serious and definitive breach of behavior is detected and/or when multiple suspicious events are detected or a pattern of unacceptable behavior has occurred.

Another input to the algorithm is simply the passage of time. For example, when a shopper removes a large number of units from a fixture, this behavior is generally viewed as suspicious and would negatively affect their TSS. This could result in denied unsupervised access. However, this behavior may have been instigated by an in-store sale or may simply be forward buying behavior based solely on a discounted price or promotion. If a shopper forward buys several packs of razor blades for example, the algorithm may drop their TSS sufficiently to be restricted from accessing any locked merchandise. After the passage of a specified period of time, the algorithm would increase their TTS to an acceptable level to allow self-service access again. The algorithm may also allow the same individual to be granted access to other merchandise while being restricted from accessing razor blades for a specified period of time.

Accordingly, the set of shopping behavior factors that may be considered by the algorithm include, but are not limited to:
Immediate past behavior event.
Multiple past behavior events.
Patterns of behavior (such as attempts to "game the system" like alternating acceptable behavior and theft behavior to gain tokens).
Accuracy of sensing technology: The ability to detect suspicious behaviors is based on the type of behavior detection sensors; for example, dispensing devices typically have a very high accuracy on the quantity and specific merchandise removed while vibration detection devices are less accurate; video sensing accuracy is often dependent on camera placement and merchandise type. Below are certain examples of behaviors to be sensed.
Value of merchandise subjected to unacceptable removal.
Specific SKUs removed.
Time between past and current attempts to access the merchandise.
Shopper history; purchasing history; registered membership in store programs; store App utilization; and/or long and frequent loyalty would be considered more trusted;

The inclusion and/or weighting of the above factors are used either alone, or in combination with Shopper Metadata, and the individual's classification by the algorithm and result in a "Trusted Shopper Score" for that individual. The retailer then sets a TSS threshold which is used by the invention in evaluating merchandise access requests to locked fixtures or other conveniences. This same TSS may be used by other store systems for granting levels of shopper permissions, such as unsupervised self-checkout, use of store portable scanning devices, and other privileged services, or virtually any service which otherwise would require supervision by store personnel.

Penalty for Crossing the Trusted Shopper Score Threshold

When a shopper crosses the trusted shopper score threshold, they will be denied self-service access to the invention. This denial-of-service period can be for a specified period of time depending on the level of the TSS. For example, if the TSS falls slightly below the threshold, a one-week denial of service could be invoked. If the TSS drops significantly below the threshold, the individual may be denied self-service access for a month or more. If the individual is detected concealing merchandise or removing a substantial amount of merchandise, that individual may be denied self service access for a year or perhaps permanently.

Anti-Fraud Applications for First Locked Fixture Interactions

The configuration variables of the invention enable the retailer to determine how to initiate new shoppers into the system. For example, the algorithm could be configured such that all first-time users (except those in the pre-existing "Known Offender" database, described later) are considered trusted and provided privileged access. So long as acceptable behavior is observed on the initial and subsequent interactions, access privilege is granted.

An alternative implementation might require shoppers to register or "opt-in" to the system (e.g., via a loyal shopper program or other identification means described above) as a prerequisite to being granted privileged access. By opting into the system, the shopper would then be granted greater shopping convenience. In this case, identification of the individual could link to a known "by name" loyal shopper database.

To prevent a would-be thief from committing a theft the first time they use the system, a time delay may be introduced to prevent the first-time user from self-service access for a programmable period of time. 48 hours for example. By inserting this access delay, this would frustrate the thief and cause them to abandon the theft. It would also act as an additional deterrent, providing the thief with the impression that his credentials are being "investigated and authenticated". Utilizing the Cell Phone/Text method this prevents thieves from using so called burner phones to gain initial access.

In another embodiment, other types of delays may be introduced. For example, when using the loyalty card method of access, the user may be required to complete one or several transactions linked to their loyalty card prior to gaining self-service privileges. In another example, when using the retailer's App or Loyalty card information, the user may be required to have purchased a certain dollar amount of merchandise, or complete a certain number of legitimate transactions prior to gaining self-service privileges.

In all of the above examples, the goal is to stop a would-be thief from fraudulently signing up for a loyalty card, or logging into a retailer's App, using a fraudulent cell phone number. simply to gain access to the locked case for theft purposes.

Self-Calibration of Suspicious Event Thresholds

As previously noted, if the quantity of items removed from a monitored fixture exceeds the suspicious event threshold, that transaction is deemed a "Suspicious Event" and the shopper associated with the action will be placed in a time out condition and have their TSS negatively impacted (depending on the incident and other factors comprising their Trusted Shopper Score). The removal of an extreme quantity of merchandise in a single transaction, however, would exceed an even higher suspicious event threshold defining a "Sweep Event". Even an individual with a high Trusted Shopper Score would likely be severely penalized if associated with a Sweep Event.

An acceptable number of product removals will vary based the type of merchandise contained in the locked fixture. As the number of locked fixtures utilizing the invention grows, a single retailer may have thousands of cases utilizing this self-service invention. Manually determining, configuring, and maintaining appropriate event thresholds, especially the Suspicious Event threshold across thousands of locked fixtures across hundreds of stores, can become very time consuming and perhaps impractical to manage. The fine line between a reasonably normal shopping quantity and a somewhat excessive quantity can vary by merchandise assortment, store location, and even season of the year. The invention's threshold self-calibration function automates this task by periodically adjusting the Suspicious Event threshold based on a statistical analysis of customer behaviors over time.

Other behaviors which the invention measures which would also be subject to the auto-calibration algorithm to statistically analyze and establish suspicious event thresholds includes but are not limited to the following:

1) Net units removed from the fixture in a single transaction. This is the net of units removed and units replaced in the same transaction.
2) The net units removed from the fixture which represent an "excessive" number of units removed (such as a sweep event).
3) The duration the movable door is in an open state.
4) The number of times a unique user accesses the same fixture in a defined unit of time (for example: 24 hours, 48 hours, 72 hours, one week etc.).
5) The number of times a unique user accesses any fixture in the system of fixtures in a defined unit of time (for example: 24 hours, 48 hours, 72 hours, one week etc.).

Self-calibration requires the retailer to establish an initial Suspicious Event Rate by estimating the percentage of transactions representing Suspicious Events. For example, the retailer may estimate (as is generally the case) that 98 of its shoppers are trusted and legitimate, and therefore 2% of its shoppers are potential offenders. This estimate represents the percent of fixture opening events that would likely be related to theft events. This percentage establishes the Suspicious Event Rate. After an initial statistically relevant number of fixture opening events, the system would then automatically adjust the Suspicious Events Threshold (defined as the number of unit removals determined to be suspicious) based on actual measured product removal behavior observed by previous shoppers according to the percent threshold set by the retailer. The invention's self-calibration algorithm retains product removal data from each opening event and uses that data to calculate a suspicious event threshold based on the suspicious event rate indicated by the retailer. In this example, the number of units removed by the top 2 percent of shoppers would be deemed Suspicious Events. The invention then periodically adjusts the threshold on a rolling basis to take into account possible merchandise changes, sale events, and other external factors that would affect the number of product removals from the locked fixture.

This self-calibration algorithm uses statistical methods to eliminate "outliers" representing non-standard behaviors which would otherwise skew the Suspicious Event Threshold or other system data in general. For example, if the top 2% of shopper merchandise interactions contain non-standard behaviors, the self-calibrating algorithm would determine if these interactions are non-standard outliers, and remove these outliers from the calculation of the suspicious event threshold. To illustrate this scenario, if one or more of the 2% of shoppers used to establish the suspicious event threshold were to take 500% more than the remainder of the top 2% of shoppers, this could skew the average for this group and could impact one of the methods for calculating the suspicious event threshold. Removing these outliers will create a more accurate suspicious event threshold based on more standard behaviors.

These statistical methods also provide a means of conditioning the data to remove outlier events which are non-standard events which could skew the data. Normal statistical methods and norms are utilized by the invention to condition the data and remove these outliers prior to applying the statistical analysis and establishing the suspicious event thresholds.

The invention requires initial suspicious event thresholds to be established such that the system can operate prior to sufficient data collection is completed and the auto-calibration to take effect and adjust the suspicious event thresholds. These "default" thresholds are utilized by the invention until the auto-calibration adjusts according to historical user behaviors.

The invention also provides the ability for system operators to override the auto-calibration features and to manually enter suspicious event thresholds which would be fixed in nature and not automatically adjust. This override functionality can be applied to any of the measured behaviors individually.

This self-calibrating algorithm may accept external metadata and individual classification as inputs to more specifically calibrate each individual fixture and dynamically change the suspicious event threshold according to changes in merchandise, pricing, or other external factors that may affect product removal behaviors. This meta data may include but is not limited to the following; SKU level information about what merchandise is contained in the locked case (no matter how this data is collected), RFID information, planogram information, pricing data, as well as promotional information, weather events, any natural disaster events, civil unrest, or any other metadata which is likely to affect product removal behaviors.

It is advantageous to eliminate known merchandise stocking data from the self-calibration algorithm. In the event the system has access to metadata and is aware of individual classifications such as store associates, vendors or other non-customers accessing the locked fixture and the associated re-stocking events, the self-calibrating algorithm would ignore product interaction data associated with non-customer-initiated re-stocking events (or customer assistance requests for denied or opt-out customers). In this way, the algorithm may more accurately determine normal product removal thresholds without the additional outliers created by stocking events or other non-customer generated product removal events.

The Role of Metadata Databases and Integration with Other Store Systems

The invention's benefits can be enhanced through access to various Metadata (other data from independent databases which can be correlated to an individual attempting to access the case). The following Metadata could be used to enhance an individual's classifications, their trusted shopper score, and other purposes:

Registered Loyal Shoppers Database—as noted previously, customer loyalty card information can be useful as a means of rewarding loyal customers by initiating privileged access. The shopper's purchase history, total spend, unique shopping habits, duration in the membership program, and overall loyalty may be considered by the Trusted Shopper algorithm in deeming certain actions acceptable.

Financial Information: A shopper who uses a debit card or a credit card to access the case could provide information about their financial condition. These factors such as credit score, bank balances, credit limits etc. can provide an enhanced risk profile for individuals attempting to access the case.

Purchase history of a shopper—by accessing a shopper's personal shopping history, the TSS algorithm may provide for a more lenient treatment of suspicious events committed by shoppers who spend over a threshold with a retailer. This allows for the avoidance of denying self-service access by a retailer's highest spending customers.

Known Offender Database-includes known perpetrators such as convicted shoplifters, suspected booster gang members, and other individuals banned from privileged access. This database can be an integration of data provided by local law enforcement, through the retailer's own case management system, or other known offender databases. Known offenders are denied self-service access but may still access the merchandise by the system notifying a store associate to unlock the fixture. The system can notify the store associate and communicate that a known offender is requesting access to the locked merchandise, allowing the associate to follow alternate product protection protocols such as bringing the merchandise to the cashier rather than handing it to the offender. Further, in the case of unsecured but monitored merchandise, merchandise interaction by those shoppers identified as known offenders will result in immediate store associate notification actions as well as deployment of local deterrents, as described earlier. It is especially noteworthy that the known offender Database is not exclusive to a specific store location but is a composite from across multiple stores in that retailer's chain and perhaps even shared information from other retailers.

Store Associates Database-includes the identity of all store employees and is used to provide ready access to secured merchandise to the associate in the course of assisting shoppers not granted self-service privileged access; further, since the act of re-stocking merchandise can be interpreted by some sensors as a theft occurrence, an authorized store associate would avoid this determination (for this reason, the system may also refer to the time clock system database to verify the store associate is on duty as a condition to ignoring what would otherwise be deemed a suspicious event). This database can be coupled to the retailers HRIS system which can automatically enroll and remove store associates as they are hired and terminated from the company. Additionally, this data would be used by the self-calibrating algorithm to ensure only customer product removal data is used in determining the suspicious event thresholds.

Vendor Employee Database—in some cases, retailers ask merchandise vendors to re-stock shelves with their products. In these cases, non-retailer employees may be granted access to the locked cases the same way store associates are granted access. Much like the Store Associates Database, this provides identity and authorization information (e.g., which merchandise locations) regarding vendors who may re-stock certain merchandise.

Video Management Systems: If video is used as a sensing technology or if the merchandise is monitored by in-store video surveillance, this video stream can be "bookmarked" by the system to enable auditing of system performance as well as the identification and possible apprehension of offenders who exhibit suspicious behaviors.

Self-Checkout Auditing: Increasingly retailers are employing self-checkouts. These self-checkouts have auditing procedures which can identify individuals who fail to scan all items or otherwise cheat the system. If individuals are uniquely identified using this process, this database can be integrated into the TSS algorithm to make better access decisions. Alternatively, once a shopper exhibits suspicious behavior at the locked case, if that customer is also identified at the self-checkout, the attendant may be notified to assist that shopper and ensure the items removed were properly checked out.

SKU Level Product Data: Awareness of the products contained in the case is useful to the TSS algorithm to more precisely set suspicious event thresholds. It is also useful for stocking and replenishment purposes, as well as compliance with retailer policies for which products should be placed in the fixture.

Gender, Age, and Mood Data: When using biometric or other personal identification methodologies, these systems are capable of determining age, gender and even mood. These inputs are useful to the system in identifying customers who may need assistance. This information is also useful to the retailer for marketing and merchandising by identifying the demographics of the customers who are accessing certain SKUs. This information can be used to display more targeted advertisements on the display of the invention or other specific local advertising vehicles.

When Merchandise Access is Denied or Delayed

In the event a shopper's Trusted Shopper Score is below the TSS threshold and requested access is denied, the invention summons assistance to meet the customer's needs; methods include:

Customer Assistance Request: An audio or text message is sent via communication devices carried by store associates or even over the PA system. The reason for the denial (for example, an unknown shopper vs. a known offender) can result in different messaging and resulting actions. In this example, and depending on store policy, associates may simply unlock the fixture and hand the desired merchandise to the unknown shopper while the associate may be required to accompany a known offender to checkout or leave the merchandise at checkout for the known offender to purchase on the way out;

Video Streaming: Making use of the invention's optional camera, video display, microphone, and speaker, an automatic live-streamed connection may be established between the shopper at the fixture and a store associate (who may or may not actually be in the store); depending on the situation, the associate may remotely command the fixture to unlock or may elect to physically go to the fixture or direct another associate to do so to assist the customer.

In some situations, there may be a delay before merchandise access is granted. For example, a retailer may elect to deter losses by configuring the system to include a hold-off time for unlocking a fixture between requests from the same shopper or possibly even different shoppers; invoking a hold-off and its duration may be influenced by the recent pattern of openings as well as the requestor's Trusted Shopper Score. In such a situation, the display provides a countdown or other indication of the holdoff to encourage the shopper to wait.

Applying Trusted Shopper Score to Self-Checkout and Exit Audits

Retailers are increasingly installing self-checkout stations in their stores at which shoppers scan and pay for their own purchases. Not surprisingly, this process is vulnerable to theft (such as not scanning all items taken by the shopper). Another method of self-checkout enables shoppers to use mobile scanning devices provided by the store or even their own smartphone loaded with a store app to perform checkout as items are selected on the sales floor and placed directly into bags or in a shopping cart. This is even more vulnerable to theft as individuals can easily drop some items into the bags without scanning or even exit the store without scanning any items at all.

The Invention can Help Reduce this Theft Activity in Three Ways:

- Self-Checkout Behavior as in Input to the TSS Score: Most self-checkout systems incorporate various devices, such as analytical video monitoring or product weight measuring devices to detect possible theft activity. Such detections can serve as an input to the trusted shopper score algorithm and could result in triggering a mandatory exit audit of a shopper's receipt against items in their cart, require a "supervised checkout" by a store associate on future visits, or a complete suspension of self-checkout privileges should a pattern emerge.
- Protected Merchandise not Scanned: As previously described, the invention uses various sensors to detect removal of high-value merchandise from secured and, in some cases, unsecured locations. This merchandise removal may be associated with a specific individual. If the removed merchandise is subsequently not scanned by the same individual through a checkout process, the algorithm may characterize that action as an unacceptable behavior that may trigger a receipt audit or lead to revocation of merchandise access and/or self-checkout privileges.
- Selective Exit Auditing: As a further action related to either self-checkout method, detection of removed merchandise not being scanned could result in the trust algorithm triggering a notification or other signaling method such that as the individual approaches a store exit, their purchases may be subjected to an exit audit to verify scanning accuracy.

Advertising, Marketing and Couponing Functions of the Invention

The invention by its very nature has a "captive audience" in terms of a shopper standing in front of a fixture containing specific merchandise. In addition, leveraging metadata and an individual's classification data, advertising can be customized. This is an ideal environment for targeted advertising to this individual in an attempt to influence their purchase behavior. This advertising capability is integral to the invention and represents "high value real estate" to any potential advertiser.

The means of advertising is common and not important to the invention. It can be either audio or audio/visual. This can be delivered through the invention's built in audio capability, an external speaker, the invention's built-in display, an auxiliary display located either on the fixture of adjacent to the fixture. Virtually any means of providing promotional messaging can be utilized.

Selecting the right type of advertisement is core to the invention. The type of advertisement can be selected based on a range of inputs. From very simple, such as what merchandise is contained in the case, to complex, utilizing personal information, metadata and an individual's classification related to the individual requesting access to the locked merchandise. Utilizing this information, the system can deliver significantly more targeted, and therefor more effective advertisements. These advertisements can be brand advertisements, promotions such as advertising a sale or special promotion. They can also be general store ads such as credit card promotions or loyalty membership benefits.

The following represent certain use cases for the advertising and marketing functions of the invention.

Merchandise Contained in the Case: In the case where the system is aware of the merchandise contained in the case, either manually entered by the retailer or detected by the merchandise movement sensor, the system can provide intelligent advertising related to and specific to the merchandise contained in the case. This can be product category advertisements or it can be brand specific ads. If the system can detect when a certain SKU is sold out, a similar product can be suggested.

Personally-Identified Shoppers: In some configurations of the invention, the system knows the shopper "by name". This is the case when the identification methodology is a shopper's loyalty card number, or a retailer's App for example. Once shoppers trade personal identifying information for the convenience of self-service access, the system knows who is accessing the merchandise. This information can be used by the system to provide more targeted advertisements, especially when a shopper's metadata is leveraged. For example, VIP customers can be identified and provided a "thank you" messaging to promote brand loyalty.

Anonymously-Identified Shoppers: In some configurations, the shopper is identified uniquely but given an anonymous User ID. In this case, the system can keep track of the shopper over time but does not know the shopper's identity. In this case, the system is aware of the products located inside multiple fixture and, based on accumulated shopper purchase behavior identified by which locked cases they have accessed, the system can play targeted advertisements when this shopper is detected dwelling in front of the fixture, or when this shopper is accessing the merchandise.

Age, Gender, and Mood Identified Shoppers: In some configurations, age, gender and mood data is added to the shopper identification. This information can be used as an input to select appropriate advertising messaging.

Shopper Dwell: The system is capable of detecting shopper dwell in proximity to the fixture using integrated dwell sensors. In some cases, this sensor cannot uniquely identify the shopper, in other cases, such as with beacons or geofencing via the retailer's app, the system can personally identify the shopper. In this scenario, advertisements can be played enticing shoppers in proximity to the fixture to purchase merchandise contained in the fixture.

Couponing: As part of the invention's marketing functions, it has the ability to dispense coupons either generally to all individuals, or selectively based on the customer data is has available. Armed with customer data, the system can choose when to dispense a coupon. VIP customers or the Retailer's Loyalty Members may be given a coupon, while non-VIP or non-loyalty customers do not.

Dynamic Couponing: If the system has the capability to detect which products are chosen from the fixture, a real-time coupon could be presented to the shopper in an attempt to influence their product selection. In a competitive situation, coupons can be dynamically dispensed based on the initial brand selection in the case. For example, if product from Brand A is selected, a coupon for Brand B can be presented. If the shopper initially selects Brand B, no coupon is provided.

In general, the system can accept inputs from any and all customer specific information, metadata sources, and its own sensor data to make intelligent decisions about advertising and couponing.

Non-Biometric Face Detection

Due to privacy concerns related to facial recognition and other forms of biometric data collection, some retailers may balk at adopting certain embodiments of the system described above. The alternative method described below avoids these concerns while still delivering many of the system's benefits.

It is noteworthy that one of the few theft prevention technologies retailers report as effective, even when used over an extended time, is the Public View Monitor (PVM). This ubiquitous device, seemingly installed in every retail store, is simply a video display with an embedded camera such that the viewer sees him or herself in the display. These are generally located at store entrances or at certain high risk merchandise. Some models provide a visual and/or audio indication when motion is detected to promote the inference of active detection. The implication is the video stream is being monitored and/or recorded. However, most PVM's are not even connected externally, much less monitored or recorded. Still, perpetrators are left to contemplate . . . are they watching? Often, the choice is to not take the chance, resulting in theft deterrence.

The alternative embodiment described here combines the uncertainty instilled by PVM's and with the deterrence of locked merchandise. Much like the invention described earlier using biometric means of uniquely identifying shoppers, shoppers desiring to purchase protected merchandise may do so by simply providing an acceptable image of their face (or other biometric information). This means of accessing locked merchandise is significantly more convenient than calling a store associate. In addition to deterring theft, this approach also averts sales loses typical of secured merchandise and boosts productivity since store staff need not repeatedly go to the merchandise to assist the shopper.

Detailed Description of the Non-Biometric Method

The following elements typically comprise implementation of this method:

Video Module: Includes a video display, an audio speaker, at least one (hard or soft) button, and optionally, a wired/wireless external connectivity provisions. Connectivity enables the Video Module to accept information from local sensors, if used, and to communicate with other devices and systems on the store's network, to include communication devices, monitoring stations, and servers. The Video Module is physically small enough to minimize merchandise obstruction and is adjustable to permit aiming the camera to capture the face of users of varying heights, including those in wheelchairs.

Electronically Controlled Lock: As variety of theft mitigation merchandise fixtures can be outfitted with the invention, the actual locking mechanism will vary. The primary embodiment employs a solenoid or magnetic locking control. Depending on the configuration, a switch or other sensor (which may be a separate device or integral to the locking mechanism) may monitor the fixture to confirm return to its secure state (such as a door in the closed position). Note that some configurations may not use a lock, as described later.

While reasonable variations of the operating sequence may be implemented, the following is typical.

First, a person desiring access to the locked merchandise so indicates by pressing a hard or soft button on the touch screen display A visual and/or audible message then instructs the user to look directly at the camera typically located above the display. The display presents the customer with an image of the shopper from the embedded camera. The customer aligns their face with a box on the screen, thus providing a perfect "mug shot" of the individual Upon detection of a face, a tracking box optionally appears around the face and/or a captured image of the face is displayed. No facial recognition occurs; merely detection that someone's human face has been presented to the camera.

After presence of the face has been detected, a short delay (typically, 3 seconds) occurs to infer processing of the image. Some may assume facial recognition and even identity database lookup is occurring during this time, though that is not the case. Various visual and/or audio cues may be presented during this time. For example, a yellow frame may appear on the perimeter of the display and the words "Processing" displayed and possibly spoken.

At the end of the delay, the lock is released, allowing the shopper to select the desired merchandise therein.

During the time merchandise is made available, merchandise removal detection sensors as described above (such as fixture vibration monitoring devices, video, pressure mats, peg hook and pusher dispense counters, and other technologies) detect the quantity of items being removed. If that quantity exceeds the suspicious event threshold also described above, the event is deemed "suspicious" and, depending on system configuration, the system may deploy a local deterrent such as a notification over the system's display, an audible alarm, flashing lights or turn on an external anti-theft deterrent and/or immediately create an alert notification to store staff, local loss prevention personnel, or a remote monitoring station. Such notification is typically accompanied by the image or video captured when merchandise access was granted.

The image of the person granted access remains on the screen until the transaction terminates, the determination of which depends on fixture type and system configuration. Three methods define termination:

Return to Secure State (Door)—This is typically detecting the return of a door on a locked cabinet or a flip door on a merchandise gondola to its closed state. It applies to other securement methods in which releasing the lock permits a person to open a door or other device then, after obtaining the desired merchandise, the door or other device is returned to the closed position, which is detected by the system using a switch or other sensor.

Controlled Dispense ("Vending" Fixture)—Some secure merchandise fixtures operate similar to a vending machine in which, once access is granted, a person takes an action to dispense one (or possibly more) items. For example, baby formula is a frequently stolen item so is sometimes displayed in a fixture allowing only one item to be removed at a time. Another example are the many methods of limiting access to merchandise typically displayed on peg hooks—from electronically locking peg hooks to "corkscrew" manual twist devices that don't prohibit access but slow it down. In these and many similar applications, an electronic locking mechanism can be fashioned and controlled by the invention.

Timed Access (Open Fixture)—In some situations, there may be no physical barrier to the merchandise. For example, a vast cosmetics assortment would be difficult or undesirable to obstruct with a physical barrier. In this situation the Video Monitor can be used in conjunction with methods to sense people interacting with merchandise. There exist numerous sensing methods for this including cameras, vibration sensors, infrared virtual fences, pressure mats, and more). Once a face has been detected, the Video Monitor permits access to this merchandise for a defined period of time and/or a quantity of accesses (penetration of hands into the merchandise area), then warns that the interval is ending. Accessing merchandise outside of this time interval can trigger a low level alarm, such as the Video Monitor providing an audio message that access granting is required or, if access persists, a higher alarm level such as notifying loss prevention personnel.

After termination of access (such as the shopper closing the door), no additional access requests will be processed throughout a configurable hold-off period, such as 30 or 60 seconds. The purpose of this hold-off period is to deter a thief from repeatedly accessing the locked merchandise and, with each access, removing a quantity of items below the suspicious event threshold. The system can be further configured to detect a suspicious pattern of repeated access which, itself, can trigger a suspicious event and/or result in the system going into lockdown mode, disabling further self-service access for a time and/or until reset by local or remote personnel.

Yet another possible system action under such suspicious circumstances is for the Video Monitor to immediately establish a real time video call with a store associate's communication device (e.g., a smart phone or similar) or to a staffed computer at a remote monitoring station. Should the subsequent conversation warrant, the store associate or monitoring station personnel can command an unlock through the communication device or computer.

Likewise, should a shopper request access during the hold-off period, the system may be configured to immediately notify a store associate that assistance is needed at that location or, as noted previously, a video call may immediately be established with appropriate personnel who can remotely unlock the merchandise, if warranted. Alternatively, if obstacles to accessing store personnel are anticipated, the video display may provide messaging to encourage a requesting shopper to wait until the hold-off period expires.

The Video Monitor is capable of providing other benefits when not serving its primary function. For example, promotional information, including videos, regarding the protected merchandise could be displayed. Another available function is simply as a camera with a unique view accessible to the store's local or remote video monitoring station.

Integration with Offender Databases & Case Management Systems

In its most full featured embodiment, this invention accumulates user behavioral data, can identify suspicious behaviors of individuals as they utilize this system, and assigns a Trusted Shopper Score to that individual based on their behavior relative to norms of behavior. By definition, this invention has visibility into a wide cross section of users including both good actors and potentially bad actors. As a data collection device and behavioral analysis tool, the invention can be thought of as a "sensor" which over time, is recording user behaviors and identifying good and bad actors via their trusted shopper score and storing that information in a database.

Outside of the system, there are $3^{rd}$ party system with offender databases. Then offender databases are generally databases of individuals who have been convicted of a crime such as theft, fraud, or violence. These offenses could be connected to a retail setting or in the community. Individuals in these databases are referred to as "Known Offenders" since they often times have in fact been convicted of a crime. These databases are typically created by both retailers and separately by local police departments or other law enforcement organizations including federal organizations and are available to retailers through cooperative agreements.

Case management systems are typically software system that accumulate incidents committed by bad actors. Incidences captured by Case Management system could be theft incidence, incidence of violence, incidence of fraud, or other incidence where people or property are put at risk. These case management systems link actions of individuals to their personal identifying information among other functions. In some cases, incidences are captured however, the individual is not identified. Although the individual may not be identified, certain characteristics of the individual are captured. These characteristics include elements such as special identifying markings like tattoos, scars, facial features, height, weight, skin color etc. They also include the offender's modus operendi or MO, meaning their preferred method of committing their offence. The MO could include the type of merchandise typically stolen, the fraud methods used, the vehicle they drove, accomplices etc.

The invention can be linked to these offender and case management databases to the benefit of the invention and these $3^{rd}$ party databases. This linkage can be accomplished via a unidirectional or bi-directional linkage. In this embodiment the invention, the invention leverages these external databases to make more informed decisions about which individuals to grant access. For example, when attempting to make a decision as to whom should be granted access using the value exchange, the invention would draw not only on its internal database and its trusted shopper scores, but also certain external databases such as offender databases and case management systems. This incremental user data was described above as Shopper Metadata. Under this scenario where the invention is linked to these external databases, the invention would ask the user to provide personal identifying information as described above. That personal identifying information would then be compared to data contained in these external databases to ensure the individual was not a known offender or an individual involved in an incident in the case management system. If the user is correlated with an individual in one of these third party databases, that individual would be prevented from self-service access. This linkage between the invention and these $3^{rd}$ party systems would typically be accomplished via a mutually defined interface known as an API. These API enable the disparate systems to communicate with each other.

In another embodiment, the invention is itself collecting behavioral information about individuals utilizing the system and storing that information in a database. Over time, the invention is identifying trusted users and untrustworthy users. This information is valuable to these external databases as they are repositories for persons of interest to law enforcement and internal detectives and loss prevention professionals employed by the retailer. For example, if a user of the invention is deemed to be untrustworthy, or was involved in a verified theft incident, that information would be passed to the case management system. Once the case management system receives this information, it would then be correlated with other disparate information which could offer a more complete profile of an offender. The information the invention would provide includes some or all of the following; a clear image of the offender's face, a video of their transactions at the invention, the user's personal identifying information (as described above), date and time of the offence, and a collection of other events captured while the user was using the invention. These incremental bits of information about the user would be combined with data contained in these external databases to enhance the external database's value as an investigative tool.

We claim:

1. A system for enabling self-service access to at least one restricted fitting room or cluster of fitting rooms in a retail environment, comprising:
   a. providing the at least one restricted fitting room or cluster of fitting rooms further comprising a restriction point at which access is restricted;
   b. providing a means of uniquely identifying an individual attempting to access the at least one restricted fitting room or cluster of fitting rooms; and
   c. providing a means of automatically enabling access to the at least one restricted fitting room or cluster of fitting rooms.

2. The system of claim 1, wherein the means of uniquely identifying the individual comprises a means of receiving personal identifying information of the individual which is provided by at least one selected from the group consisting of a touchscreen display, a camera, a smartphone app, QR or Bar code scanner, or a web page to enter the information.

3. The system of claim 2, wherein a form of the personal identifying information of the individual is at least one selected from the group consisting of shopper loyalty card information, government issued ID, financial institution cards such as debit cards or credit cards, cell phone numbers, cell phones carried by shoppers which may have local connectivity as a means of identification, a retailer's App which the shopper is logged into, biometric information such as facial recognition, palm ID, finger print readers, or other forms of biometric identifiers, employee ID cards or employee numbers, or any other form of personal identifying information.

4. The system of claim 1, wherein the system can verify the individual is in proximity of the fitting room or cluster of fitting rooms using at least one secondary authentication method.

5. The system of claim 1, wherein the restriction point is located at an entrance to the fitting room cluster where one or more individual fitting rooms are located or at an entrance to each individual fitting room.

6. The system of claim 1, wherein the means of automatically enabling access to the fitting room or cluster of fitting rooms is at least one selected from the group consisting of magnetic door locks, solenoid actuated door locks, electronic locks, electronically controlled turnstiles, electronically controlled gates, software defined virtual fences utilizing cameras to identify penetrations through the virtual fence, or other means of restricting access.

7. The system of claim 6, wherein the means of automatically enabling access to the fitting room or cluster of fitting rooms further comprises a means of automatically restricting access once the individual passed the restriction point.

8. The system of claim 2, wherein a touchscreen display is an interface for entering information into the system.

9. The system of claim 2, wherein the individual utilizes a mobile device as the interface for entering information into the system or receiving information from the system.

10. The system of claim 2, wherein the individual utilizes an app on a mobile device as the interface for entering information into the system or receiving information from the system.

11. The system of claim 1, wherein the individual enters a fitting room identifier to indicate which fitting room access is desired.

12. The system of claim 1, wherein the system automatically assigns the fitting room to the individual seeking access.

13. The system of claim 1, wherein the means for enabling access is computer controlled.

14. The system of claim 1, wherein the system can autonomously restrict access to the fitting room or cluster of fitting rooms following an access event.

15. The system of claim 1, wherein the fitting room is equipped with a means of determining occupancy and can identify when the fitting room is occupied.

16. The system of claim 15, wherein the system only grants access to the individual when the status of the fitting room is unoccupied.

17. The system of claim 1, wherein the system has a means of identifying the number of persons passing through the restriction point for each authorized entry.

18. The system of claim 17, wherein the system receives as an input the number of persons in each party requesting access at the restriction point.

19. The system of claim 1, wherein the individual can re-enter the individual's fitting room using a token-based method for a programmable period of time after their initial access.

20. The system of claim 1, wherein the system can automatically receive the personal identifying information at the restriction point using biometric identification.

21. The system of claim 1, wherein the system receives information from at least one database which is correlated to the individual's personal identifying information.

22. The system of claim 21, wherein the information from the at least one database is used to determine if the individual will be granted access.

* * * * *